United States Patent
Li et al.

(10) Patent No.: US 7,798,022 B2
(45) Date of Patent: Sep. 21, 2010

(54) TESTING DEVICES FOR MULTIHOLE WORKPIECE

(75) Inventors: Lei Li, Shenzhen (CN); Ping Chen, Shenzhen (CN); Zhi Cheng, Shenzhen (CN); Ai-Ge Sun, Shenzhen (CN); Lin-Sen Dong, Shenzhen (CN); Chang-Fa Sun, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 430 days.

(21) Appl. No.: 11/926,495

(22) Filed: Oct. 29, 2007

(65) Prior Publication Data

US 2008/0168849 A1 Jul. 17, 2008

(30) Foreign Application Priority Data

Jan. 12, 2007 (CN) .................. 2007 1 0072940

(51) Int. Cl.
*G01M 19/00* (2006.01)

(52) U.S. Cl. ...................................... 73/865.8; 324/755
(58) Field of Classification Search ................ 73/865.8; 324/755

See application file for complete search history.

(56) References Cited

U.S. PATENT DOCUMENTS 3,965,562 A * 6/1976 Inoyama ................... 29/407.04
6,859,055 B2 * 2/2005 Wilk .......................... 324/755
7,602,201 B2 * 10/2009 Ysaguirre et al. ........... 324/755

* cited by examiner

*Primary Examiner*—Thomas P Noland
(74) *Attorney, Agent, or Firm*—Jeffrey T. Knapp

(57) ABSTRACT

A testing device (100) configured for testing a multihole workpiece (10) with a plurality of holes (12), includes a detecting station (120) and an inspecting box (140). The detecting station positions a plurality of detecting pins (124) and a plurality of detecting apparatus (128). The detecting pins correspond to the holes of the multihole workpiece. The detecting apparatus respond for the multihole workpiece and sending detecting signals. The inspecting box receives the detecting signals from the detecting apparatus of the detecting station, and deals with and shows detecting results.

16 Claims, 8 Drawing Sheets

TESTING DEVICES FOR MULTIHOLE WORKPIECE

BACKGROUND OF THE INVENTION

1. Field of the Invention

The present invention relates to testing devices and, particularly, to a testing device for multihole workpieces.

2. Description of Related Art

Multihole workpieces are widely used in many manufacturing industry. Multihole workpiece usually defines a great amount of holes therein. Referring to FIGS. 7 and 8, a multihole workpiece 10 has a plurality of holes 12 defined therein. The holes 12 are manufactured with many punches. However, since some punches tends to fail during the manufacturing process, some holes 12 are not often formed. As the holes 12 are very tinny, operators find it difficult to spot the uncompleted holes, which decrease the efficiency of the assembly process. Therefore, it is very important for the holes 12 in the multihole workpiece 10 to be tested.

Conventional detecting methods include a manual testing method and a non-contacting testing method. The manual testing method is that operators lower a needle into each hole of the workpiece so as to test whether the holes is through or not. The manual testing method is simple. However, when there are large numbers of holes, it is possible for the operator to miss the uncompleted holes. In addition, this testing process is time consuming, which affect the efficiency of the testing process. The non-contacting testing method can detect the uncompleted holes of multihole workpiece. However, the structure of the non-contacting testing device is complicated and large in volume. Therefore, it is difficult to move/relocate the non-contacting testing device. In addition, the non-contacting testing device is desired to work in a non-polluting testing environment to avoid components being contaminated by dusts. If the testing device works in a dusty environment, the testing reliability is low.

Therefore, a new testing device is desired in order to overcome the above-described shortcomings.

SUMMARY OF THE INVENTION

One present embodiment of a testing device configured for testing a multihole workpiece with a plurality of holes, includes a detecting station and an inspecting box. The detecting station positions a plurality of detecting pins and a plurality of detecting apparatus. The detecting pins correspond to the holes of the multihole workpiece. The detecting apparatus respond to the multihole workpiece and send detecting signals. The inspecting box receives the detecting signals from the detecting apparatus of the detecting station, and processes and displays detecting results.

Other advantages and novel features will become more apparent from the following detailed description when taken in conjunction with the accompanying drawings.

BRIEF DESCRIPTION OF THE DRAWINGS

Many aspects of the present testing device can be better understood with reference to the following drawings. The components in the drawings are not necessarily drawn to scale, the emphasis instead being placed upon clearly illustrating the principles of the present testing device. Moreover, in the drawings, like reference numerals designate corresponding parts throughout the several views.

DETAILED DESCRIPTION OF THE EMBODIMENTS

Figure 7:
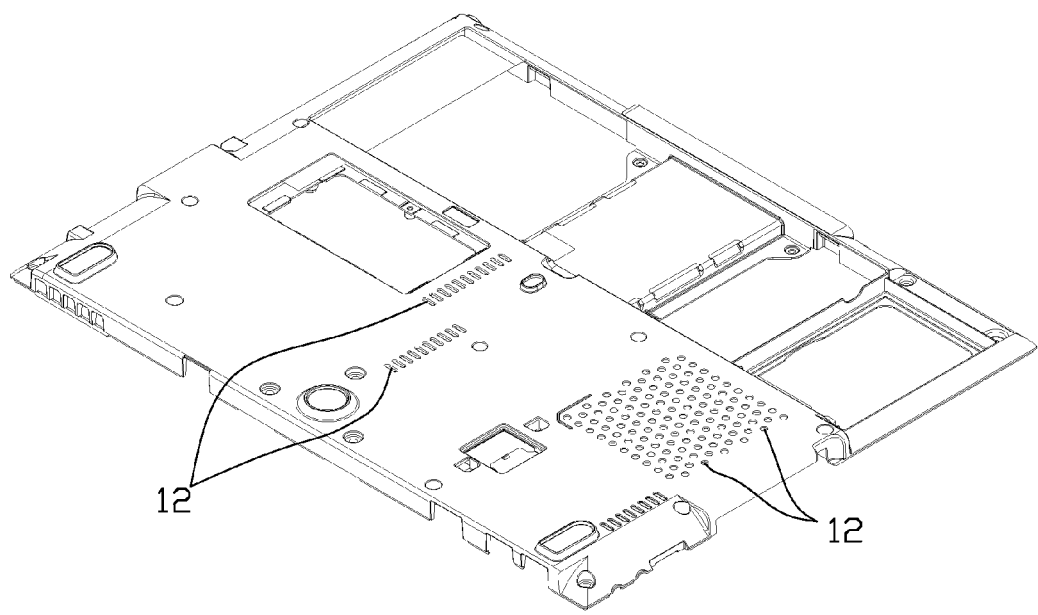
FIG. 7 is an isometric view of a related art of a multihole workpiece from one aspect.
Figure 8:
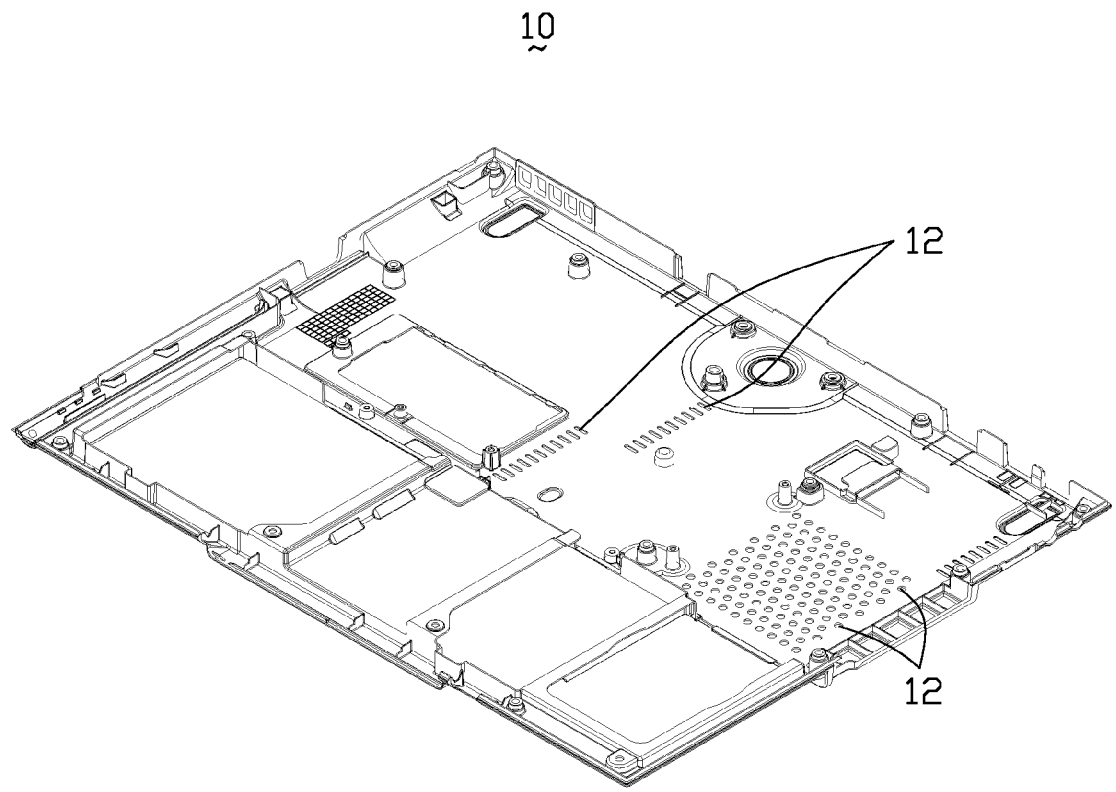
FIG. 8 is an isometric view of the related art of a multihole workpiece shown in FIG. 7 from another aspect.

The present testing device is suitable for testing multihole workpiece with a plurality of holes manufactured by punch process, boring process and so on. In this embodiment, the multihole workpiece 10 in FIG. 7 is as an example to illustrate the present testing device. It is to be understood, however, that the present testing device could be advantageously used in other environments. As such, the present testing device should not be limited in scope solely to them.

Figure 1:
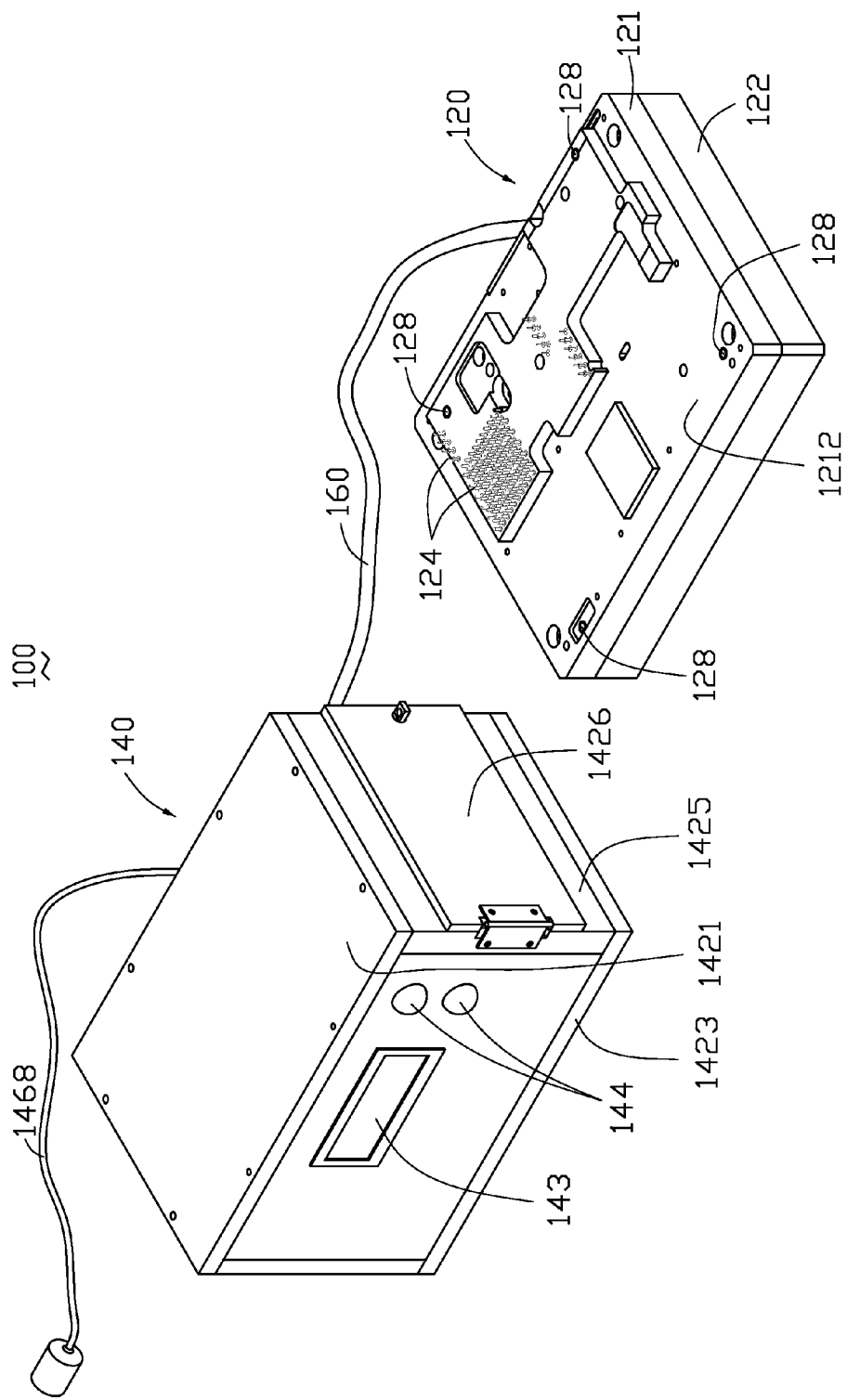
FIG. 1 is an isometric view of a testing device according to a present embodiment.

Referring now to FIG. 1, a testing device 100 according to a present embodiment is provided. The testing device 100 includes a detecting station 120, an inspecting box 140, and a transmitting conduit 160. The detecting station 120 is connected to the inspecting box 140 with the transmitting conduit 160.

Figure 2:
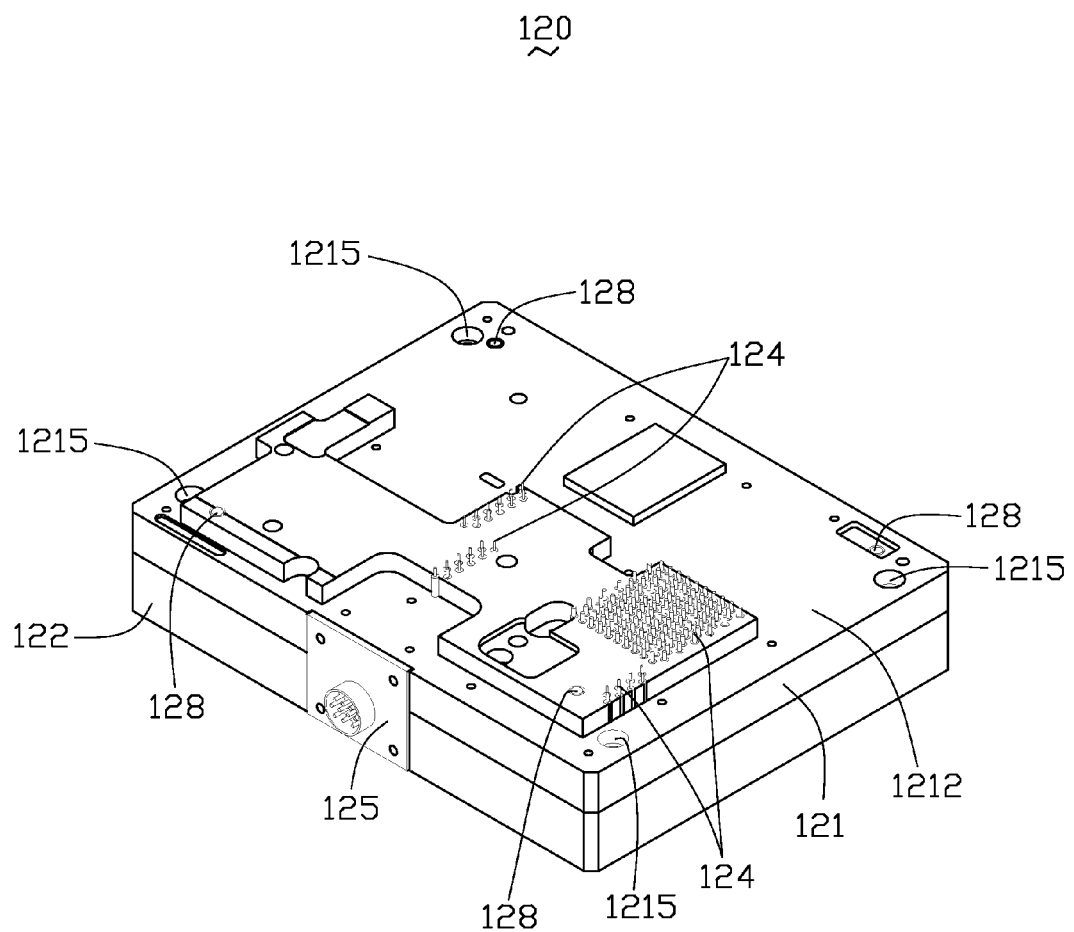
FIG. 2 is an isometric view of a detecting station shown in FIG. 1.

Referring also to FIG. 2, the detecting station 120 includes a base 121, a seat 122, a plurality of detecting pins 124, a signal output apparatus 125 and four detecting apparatus 128. The base 121 is fixedly mounted on the seat 122. The detecting pins 124, and the detecting apparatus 128 are disposed on the base 121. The signal output apparatus 125 is positioned at one side of the base 121 and the seat 122.

Figure 3:
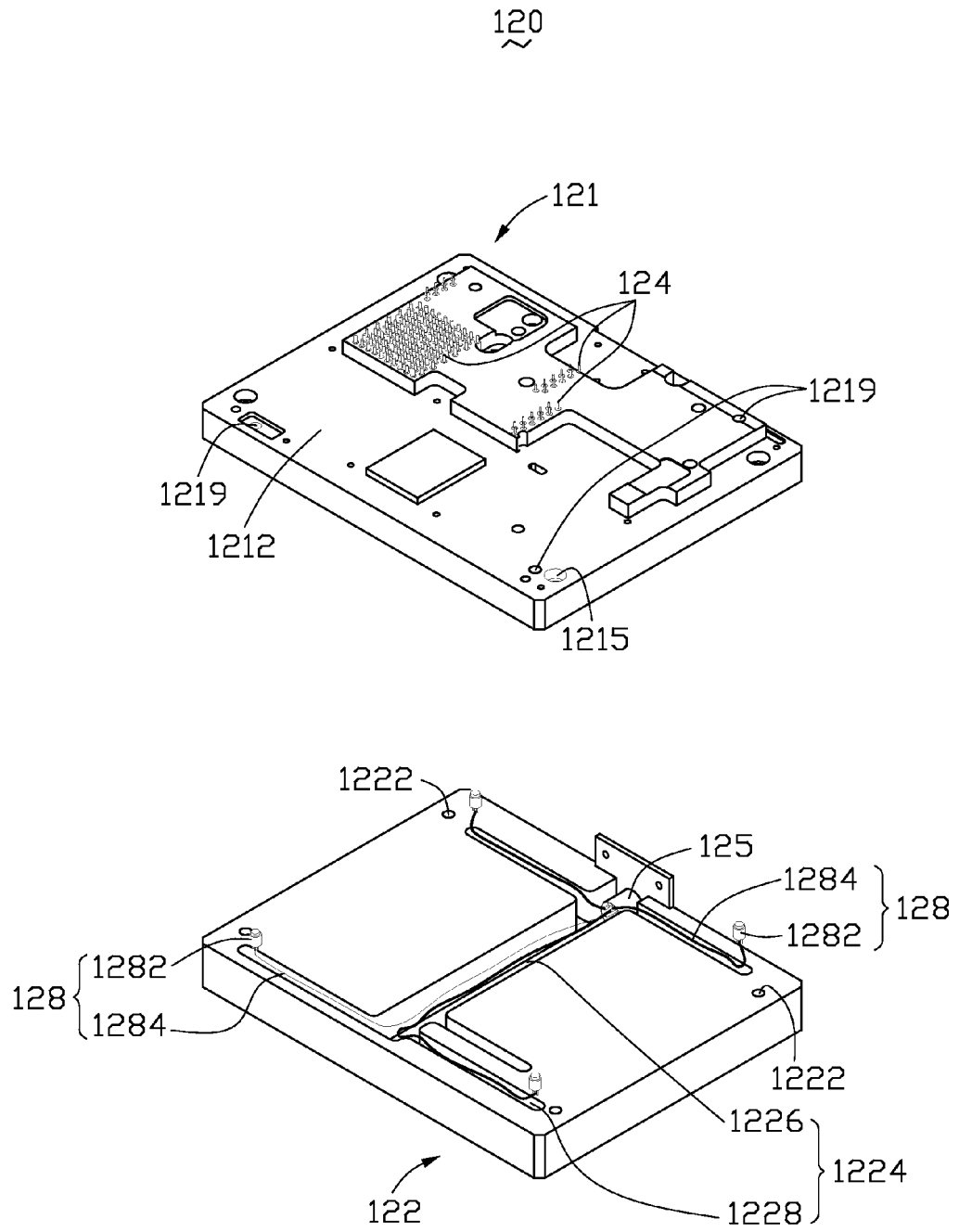
FIG. 3 is a partially exploded, isometric view of the detecting station shown in FIG. 2 from one aspect.
Figure 4:
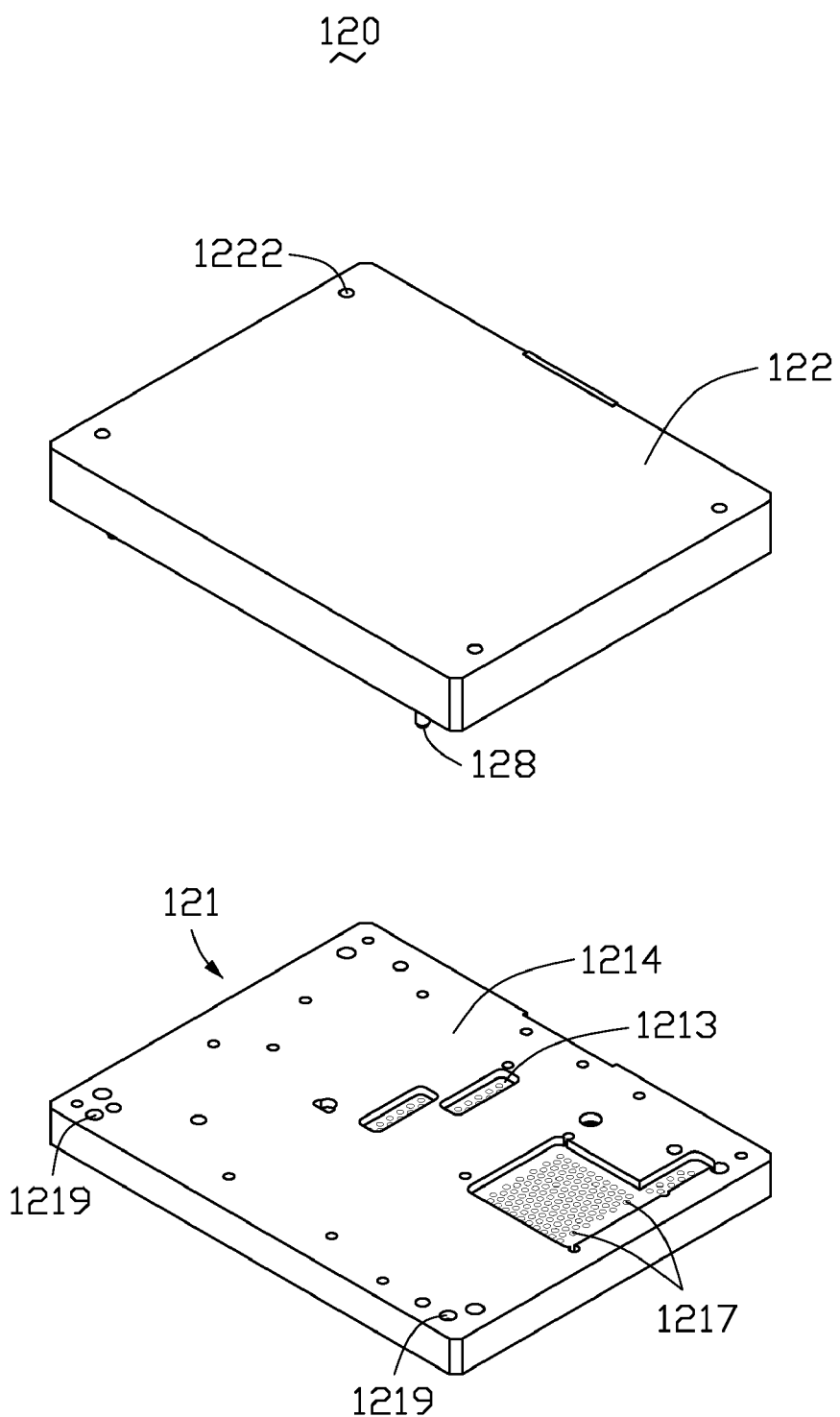
FIG. 4 is a partially exploded, isometric view of the detecting station shown in FIG. 2 from another aspect.

Referring to FIGS. 3 and 4, the base 121 is a rectangular board, and the shape of the base 121 is similar to the multihole workpiece 10. The base 121 includes an upper surface 1212 and a lower surface 1214.

The base 121 defines four countersinks 1215 and four receiving holes 1219 at four corners thereof. Each countersink 1215 is used for receiving bolts (not shown). Each receiving hole 1219 is used for receiving a corresponding detecting apparatus 128.

The base 121 defines a plurality of pin holes 1213, 1217 therein. The arrange of the pin holes 1213, 1217 is similar to that of the holes of the multihole workpiece 10. Each pin hole 1213, 1217 is a through hole communicating with the upper surface 1212 and the lower surface 1214 of the base 121. Each pin hole 1217 is configured for receiving a corresponding detecting pin 124.

Each detecting pin 124 is substantially cylindrical. One end of each detecting pin 124 is tightly engaged into a corresponding pin hole 1213, 1217, the other end thereof extends outwardly from the base 121 of the detecting station 120. An outer diameter of each detecting pin 124 is smaller than that of each hole 12 of the multihole workpiece 10. With the diameter and the height of detecting pins 124 being smaller than each hole 12, the detecting pins 124 pass through a corresponding hole 12 of the multihole workpiece 10.

The seat 122 is a flat board, and the size is substantially the same as the base 121. The seat 122 defines four bolt holes 1222 at four corners thereof corresponding to the countersinks 1215 of the base 121. The seat 122 defines a H-shape notch 1224 on a surface thereof. The notch 1224 includes a middle notch 1226 and two side notches 1228. The middle notch 1226 communicates with the two side notches 1228. One end of the middle notch 1226 extends through one side of the seat 122.

The signal output apparatus 125 is used for being positioned at the side of the seat 122 and the base 121 and partially received in the middle notch 1226. The signal output apparatus 125 is electrically connected to the inspecting box 140 with the transmitting conduit 160.

Each detecting apparatus 128 includes a cylindrical detector 1282 and a wire 1284. The height of each detector 1282 may be adjusted, and one end of each detector 1282 is electrically connected to the wire 1284. Each detector 1282 is fixed in a corresponding receiving hole 1219 by means of adhesive or thread. The wire 1284 of the detecting apparatus 128 may pass through the receiving hole 1219, and further extend through the notch 1224 to the signal output apparatus 125.

Figure 5:
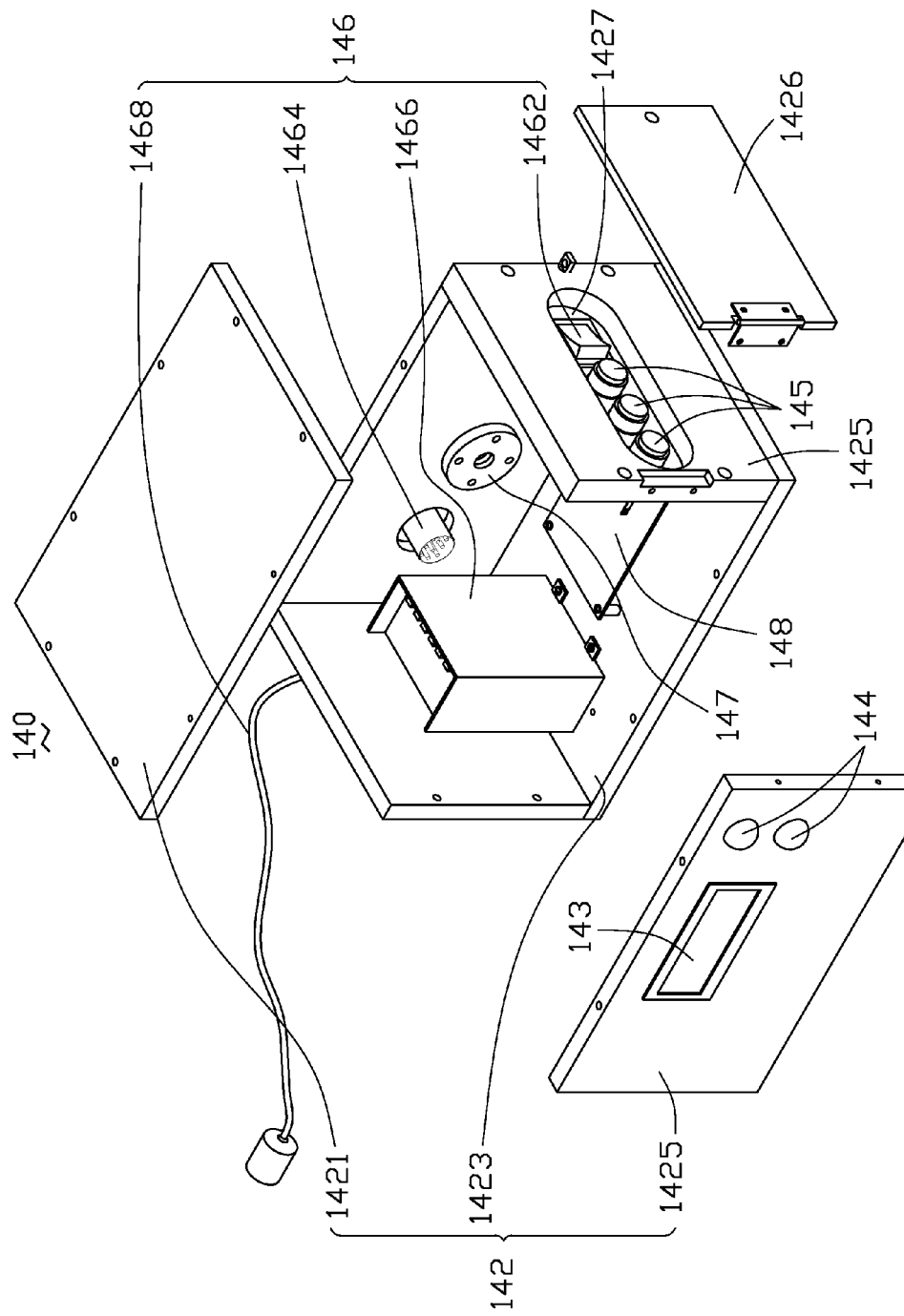
FIG. 5 is a partially exploded, isometric view of an inspecting box shown in FIG. 2.

Referring to FIG. 5, the inspecting box 140 is a detecting control apparatus. The inspecting box 140 may receive the electronic signal from the detecting apparatus 128, and automatically display the quantity of the satisfied product. The inspecting box 140 includes a cabinet 142, a display apparatus 143, two indication apparatus 144, an operation apparatus 145, a power apparatus 146, a signal input apparatus 147 and a signal processor 148.

The cabinet 142 is an airtight, rectangular box, and includes an upper board 1421, a lower board 1423, four side boards 1425, and a cover board 1426. The upper board 1421, the lower board 1423 and the side boards 1425 may be fixed with bolts. The display apparatus 143 is positioned on a front side boards 1425 of the cabinet 142. The two indication apparatus 144 are positioned on the front side boards 1425 adjacent to the display apparatus 143. The indication apparatus 144 may respectively show whether the tested product is the satisfied product or the unsatisfied product or not. A right side board 1425 adjacent to the front side board 1425 defines a concave room 1427. The operation apparatus 145 includes a plurality of buttons, and is positioned in the concave room 1427.

The power apparatus 146 includes a power switch 1462, a power socket 1464, a rectifying supply 1466 and a resist-blast wire 1468. The power switch 1462 is positioned in the concave room 1427. The cover board 1426 is used for covering the concave room 1427 of the side board 1425. The signal input apparatus 147 and the power socket 1464 are located on a back side board 1425 of the cabinet 142. The rectifying supply 1466 and the signal processor 148 are disposed in the lower board 1423. The signal processor 148 may comprise the AT89C52 chip made by Atmel Corporation Company in USA. The signal processor 148 is served as a main control element.

The transmitting conduit 160 are made up of a plurality of wires used for transmitting signal. One end of the transmitting conduit 160 is connected to the signal output apparatus 125, the other end thereof is connected to the signal input apparatus 147 of the inspecting box 140.

In assembly, firstly, the detecting pins 124 are respectively embedded in a corresponding pin hole 1213, 1217 on the base 121. Then, the four detecting apparatus 128 are respectively positioned in a corresponding receiving hole 1219 of the base 121. The wire 1284 of each detecting apparatus 128 extends through the receiving hole 1219 to the notch 1224 of the seat 122. After that, the signal output apparatus 125 is secured in one side of the seat 122 and is partially received in the middle notch 1226. The wires 1284 are electrically connected to the signal output apparatus 125. Finally, the base 121 is fixed on the seat 122 with four bolts engaging in the bolt holes 1222 and the countersinks 1215, thereby completing the assembly of the detecting station 120.

The lower board 1423 and the side boards 1425 are connected with bolts to form a box with an open on a top thereof. Then, the display apparatus 143, the indication apparatus 144, the operation apparatus 145, the power apparatus 146, the signal input apparatus 147 and the signal processor 148 are provided at a corresponding position of the cabinet 142, and electrically connected with each other. After that, the upper board 1421 is placed on top of the four side boards 1425 to enclose the cabinet 142. A connection among the boards is coated with sealing glue so as to prevent blast dust to enter the cabinet 142. The airtight design of the cabinet 142 may avoid producing electric arc or electrostatic to blast dust. Finally, the cover board 1426 is pivotally connected to the side board 1425 of the cabinet 142, and covers the concave room 1427. Therefore, the assembly process of the inspecting box 140 is completed.

Figure 6:
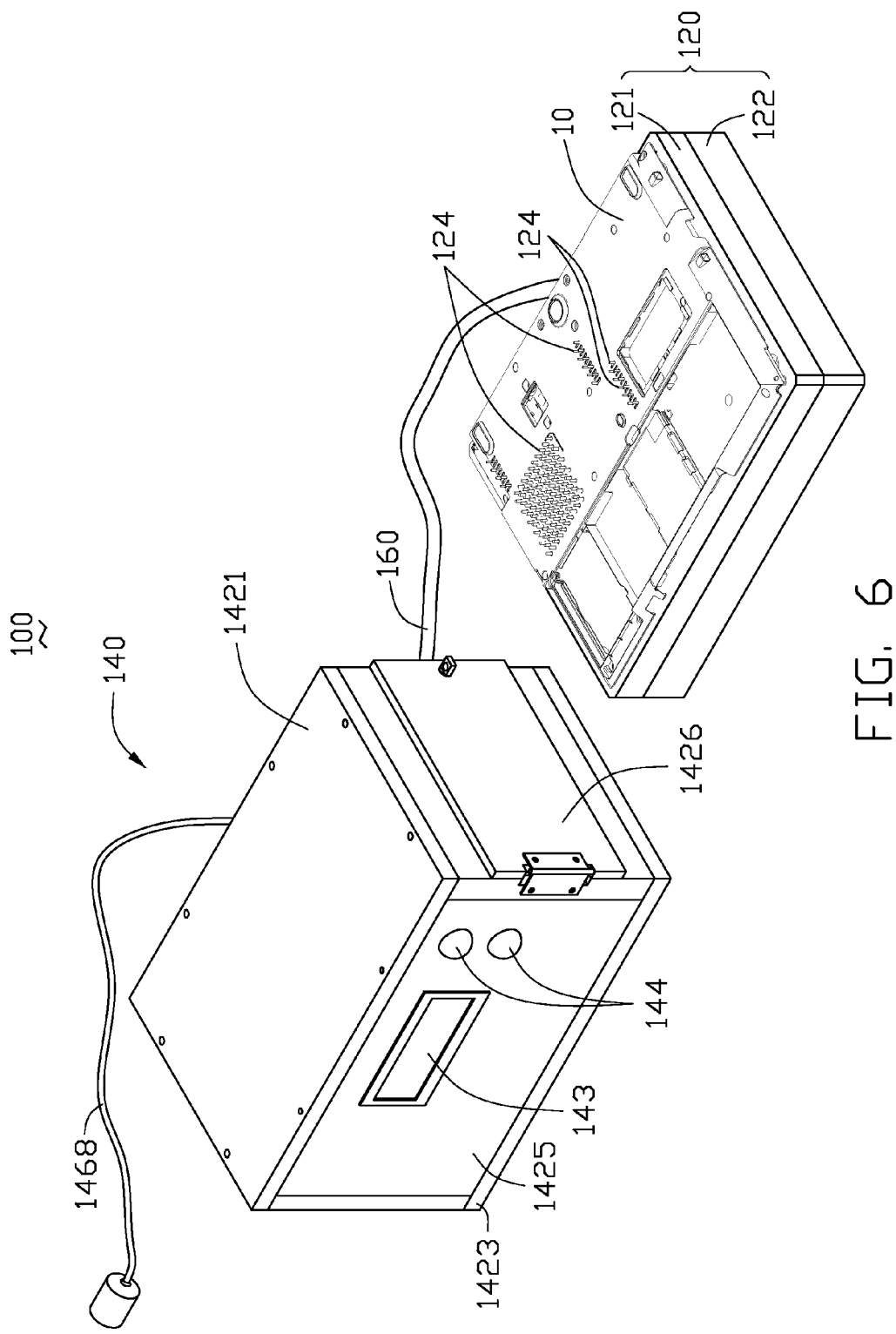
FIG. 6 is an isometric view of the testing device in use.

In use, referring to FIG. 6, the resist-blast wire 1468 is electrically connected to a power supply. The cover board 1426 of the inspecting box 140 is opened, and the power switch 1462 is turned on. The operation apparatus 145 is reset, and the cover board 1426 is closed to prevent dust entering the concave room 1427.

After that, the multihole workpiece 10 is placed on the base 121 of the detecting station 120. The holes 12 of the multihole workpiece 10 are aligned with the detecting pins 124 of the detecting station 120. If the holes 12 of the multihole workpiece 10 are completely formed, the multihole workpiece 10 stays on top of the base 121. At the same time, the detecting apparatus 128 detect the multihole workpiece 10, and generate a corresponding signal. The signal is transmitted to the inspecting box 140. The inspecting box 140 controls the indication apparatus 144 to show whether the multihole workpiece is satisfied. If the holes 12 of the multihole workpiece 10 are left out or uncompleted, the multihole workpiece 10 will resist by the detecting pins 124 so as not to stay on top of the base 121. Therefore, the four detecting apparatus 128 cannot respond to the multihole workpiece 10. The indication apparatus 144 will then indicates that the multihole workpiece 10 is not satisfied.

A main advantage of the present testing device is that the detecting pins 124 with the detecting apparatus 128 detect whether the multihole workpiece is satisfied, and the inspecting box 140 will record and display the detecting signal of the detecting apparatus 128. This structure is simple and the manufacturing costs are low. In addition, the testing device will not be affected with outside environment, which increase the reliability of the testing process. Furthermore, the inspecting box 140 uses an airtight cabinet 142 to enclose the elements in the inspecting box 140. Therefore, the dusts from the outside environment are isolated from the inspecting box 140.

Understandably, the testing device may test different configuration multihole workpiece. The shape of the base of the testing device needs to conform the shape of the tested multihole workpiece.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A testing device configured for testing a multihole workpiece with a plurality of holes, comprising:

a detecting station, the detecting station including a base, the shape of the base corresponding to the multihole workpiece, the detecting station positioning a plurality of detecting pins and four detecting apparatus, the detecting pins corresponding to the holes of the multihole workpiece, the detecting apparatus positioned at four corners of the base responding for the multihole workpiece and sending detecting signals;

an inspecting box, the inspecting box receiving the detecting signals from the detecting apparatus of the detecting station, and dealing with and showing detecting results.

2. The testing device as claimed in claim 1, wherein the base defines a plurality of pin holes, one end of each detecting pin is received in a corresponding pin hole, and the other end of each detecting pin extends some height.

3. The testing device as claimed in claim 1, wherein the detecting station includes a seat, the base is fixed on the seat, the seat defines a notch, the detecting apparatus includes a plurality of wires, and the wires are received in the notch and connected to the inspecting box.

4. The testing device as claimed in claim 1, wherein the detecting station includes a signal output apparatus, the signal output apparatus is positioned at one side of the base, one end of the signal output apparatus is electrically connected to the inspecting box, and the other end of the signal output apparatus is electrically connected to the detecting apparatus.

5. The testing device as claimed in claim 1, wherein the inspecting box includes a cabinet, a power apparatus, and an operation apparatus, the power apparatus and the operation apparatus are positioned in the cabinet.

6. The testing device as claimed in claim 5, wherein the power apparatus includes a rectifying supply, a power wire and a power switch, and the power wire is a resist-blast wire.

7. The testing device as claimed in claim 6, wherein the cabinet is made up of several boards, one of the boards defines a concave room, and the operation apparatus and the power switch are received in the concave room.

8. The testing device as claimed in claim 7, wherein the cabinet further includes a cover board, the cover board is rotatably covered on the concave room.

9. A testing device, comprising:

a detecting station positioning a plurality of detecting apparatus, the detecting station defining a plurality of pin holes communicating with two surfaces of the detecting station, a plurality of detecting pins latched in the pin holes, the detecting apparatus detecting and sending detecting signals;

an inspecting box, the inspecting box receiving the detecting signals from the detecting apparatus of the detecting station, and dealing with and showing detecting results.

10. The testing device as claimed in claim 9, wherein the detecting station includes a base, the shape of the base is configured for the multihole workpiece.

11. The testing device as claimed in claim 10, wherein the number of the detecting apparatus is four, and the detecting apparatus are positioned at four corners of the base.

12. The testing device as claimed in claim 10, wherein the base defines a plurality of pin holes, one end of each detecting pin is received in a corresponding pin hole, and the other end of each detecting pin extends some height.

13. The testing device as claimed in claim 9, wherein the inspecting box includes a cabinet, a power apparatus, and an operation apparatus, the power apparatus and the operation apparatus are positioned in the cabinet.

14. The testing device as claimed in claim 13, wherein the power apparatus includes a rectifying supply, a power wire and a power switch, and the power wire is a resist-blast wire.

15. The testing device as claimed in claim 13, wherein the cabinet is made up of several boards, one of the boards defines a concave room, and the operation apparatus and the power switch are received in the concave room.

16. The testing device as claimed in claim 15, wherein the cabinet further includes a cover board, the cover board is rotatably covered on the concave room.

* * * * *